United States Patent
Liao et al.

(10) Patent No.: US 9,920,218 B2
(45) Date of Patent: Mar. 20, 2018

(54) PROCESS FOR PREPARING POLYPHENYLENE ETHER MICROSPORE DISPERSION

(71) Applicant: NAN YA PLASTICS CORPORATION, Taipei (TW)

(72) Inventors: Te-Chao Liao, Taipei (TW); Jung-Jen Chuang, Taipei (TW); Hao-Sheng Chen, Taipei (TW); Yi-Cheng Li, Taipei (TW); Zhang-Jian Huang, Taipei (TW)

(73) Assignee: NAN YA PLASTICS CORPORATION, Taipei (TW)

(*) Notice: Subject to any disclaimer, the term of this patent is extended or adjusted under 35 U.S.C. 154(b) by 63 days.

(21) Appl. No.: 15/148,050

(22) Filed: May 6, 2016

(65) Prior Publication Data
US 2016/0340546 A1 Nov. 24, 2016

(30) Foreign Application Priority Data
May 18, 2015 (TW) .............................. 104115720 A

(51) Int. Cl.
| | |
|---|---|
| *C09D 171/12* | (2006.01) |
| *C08G 65/46* | (2006.01) |
| *C08L 71/12* | (2006.01) |
| *C08G 65/48* | (2006.01) |

(52) U.S. Cl.
CPC ........... *C09D 171/12* (2013.01); *C08G 65/46* (2013.01); *C08G 65/485* (2013.01); *C08L 71/12* (2013.01)

(58) Field of Classification Search
USPC ................... 523/220, 333; 524/500; 528/491
See application file for complete search history.

(56) References Cited

U.S. PATENT DOCUMENTS

| | | | |
|---|---|---|---|
| 2013/0231430 A1* | 9/2013 | I .............................. | C08L 53/025 524/323 |
| 2014/0183417 A1* | 7/2014 | Kim .................... | C01B 31/0273 252/511 |

FOREIGN PATENT DOCUMENTS

| | | | |
|---|---|---|---|
| JP | 2013-194138 | * | 9/2013 |
| JP | 2014-162850 | * | 9/2014 |

\* cited by examiner

*Primary Examiner* — Tae H Yoon
(74) *Attorney, Agent, or Firm* — Bacon & Thomas, PLLC

(57) ABSTRACT

A process for preparing PPE microspore dispersion includes steps of: dissolving a high-molecular polyphenylene ether in a first solvent at 45-110° C. to form a dissolution liquid; adding processing aids and well mixing the dissolution liquid into a dispersed phase; cooling the dissolution liquid to 42-80° C., and adding a second solvent to generate PPE microspores via PPE to wrap around the processing aids; cooling the dissolution liquid to 0-40° C. to obtain PPE microspore dispersions for use in application for impregnation processes performed below 40° C., thereby high-temperature impregnation equipment are no longer needed, and copper clad laminates made of using the PPE microspore dispersion enjoy excellent physical properties including high Tg, low Dk, low Df and high copper foil's peel strength.

11 Claims, 6 Drawing Sheets

PROCESS FOR PREPARING POLYPHENYLENE ETHER MICROSPORE DISPERSION

CLAIM OF PRIORITY

The present application claims the benefit of priority of TW patent application 104115720, entitled "Process for Preparing Polyphenylene Ether Microspore Dispersion", filed May 18, 2015, with the Taiwanese Intellectual Property Office, the content of which is incorporated herein by reference in its entirety.

BACKGROUND OF THE INVENTION

1. Field of the Invention 1Technical Field

The present invention relates to polyphenylene ether (PPE) microspore dispersions, and more particularly to a process for preparing a PPE microspore dispersion that is suitable for impregnation processes performed below 40° C.

2. Description of Related Art

PPE (Polyphenylene Ether) represents a resin featuring for excellent insulating capability, acid/alkaline resistance and superior Dk (dielectric constant) as well as Df (dielectric dissipation factor). This material is also suitable for high-frequency copper clad laminates that require low Dk and low Df, and thus has been extensively used in high-frequency communication devices.

PPE resins have better electrical properties when the molecular weight is high. For good electrical properties, each molecule of polyphenylene ether (PPE) perferably has an average phenolic hydroxyl groups (i.e., number of OH groups) ranging between 0.001 and 0.1. However, PPE resins currently used for making high-frequency copper clad laminates (HF-CCLs) are mostly low-molecular weight PPE (hereinafter abbreviated as LR-PPE) that have a number-average molecular weight (Mn) smaller than 9,000 g/mole. While LR-PPE has the advantages of being highly dissolvable in solvents, and suitable for impregnation below 40° C., it is considerably inferior to high-molecular weight PPE (hereinafter abbreviated as HM-PPE) having a number-average molecular weight (Mn) greater than 12,000 g/mole in terms of electrical property, glass transition temperature (Tg) and mechanical strength, and has no help in improving high-frequency copper clad laminates.

In the conventional method that uses PPE resins to make high-frequency copper clad laminates, one of methylbenzene, butanone and dimethylformamide is used as a solvent to dissolve PPE and form a PPE solution. Then processing aids (or called auxiliary agents) such as flame retardants, silica, binding agents, or initiators are added and well agitated to form varnish. The varnish is later used to impregnate glass fabrics at 40° C. After impregnation varnish, the prepreg is dried and undergoes heat press to be made into high-frequency copper clad laminates.

For endowing high-frequency copper clad laminates with improved electrical properties, PPE resins used in HF-CCL manufacturing are perferably HM-PPE resins, namely those having a number-average molecular weight (Mn) greater than 12,000 g/mole. During preparation of varnish and during impregnation, however, the HM-PPE solution requires a temperature higher than 40° C. The requirement for high-temperature impregnation brings about the need of high-temperature impregnation equipment for making high-frequency copper clad laminates. This in turn leads to problems relating high costs and processing safety.

As an approach to addressing theses issues, HM-PPE resins having a number-average molecular weight (Mn) larger than 8,000 but less than 40,000 are now ground, smashed or crystalized into HM-PPE particles. By using varnish made of these HM-PPE particles evenly mixed with specific processing aids required, it is possible to perform impregnation at the room temperature. However, such a PPE dispersion only allows the HM-PPE particles to be stayed with the processing aids and then causes both finally becomes like a solid-to-solid contact or a solid-to-liquid contact, so that such a PPE dispersion is contrary to a real microspore dispersion defined with structure of having HM-PPE microspores fully wrapped the processing aids.

Thus, the existing PPE dispersion disclosed in the state of art is quite not homogenized, if observed in view of micro phase. Such a non-homogenous PPE dispersion for use in making HF-CCLs has negative impact to the resultant HF-CCLs in terms of electrical property, mechanical strength and heat resistance.

SUMMARY OF THE PRESENT INVENTION

In view of this, the present invention discloses a process for preparing a PPE microspore dispersion which has microspores evenly dispersed and particularly formed by HM-PPE to completely wrap processing aids.

Such a PPE microspore dispersion of the present invention, when made into varnish, allows fibrous material (such as glass fabrics) to be impregnated with the varnish below 40° C. to form a prepreg used in making high-frequency copper clad laminates (HF-CCLs).

The PPE microspore dispersion of the present invention is so suitable to use in making HF-CCLs, since the PPE microspore dispersion provides many advantages, including improving HF-CCLs' electrical properties and eliminating the need of high-temperature impregnation that is above 40° C. As a result, the costs otherwise required for high-temperature impregnation equipment can be saved, and the manufacturing process is safer.

A process for preparing a PPE microspore dispersion is disclosed according to the present invention, comprising the following steps:

(a) selecting a high-molecular polyphenylene ether (HM-PPE) that has a number-average molecular weight (Mn) ranging between 12,000 g/mole and 30,000 g/mole, and a low-molecular polyphenylene ether (LR-PPE) that has a number-average molecular weight (Mn) ranging between 800 g/mole and 6,000 g/mole, respectively;

(b) selecting a first solvent that dissolves the HM-PPE at 45-110° C., and selecting a second solvent that does not dissolve the HM-PPE;

(c) dissolving the HM-PPE of Step (a) in the first solvent at a temperature ranging between 45° C. and 110° C. to form a PPE-based dissolution liquid;

(d) adding the LR-PPE of Step (a) and processing aids being chosen as additives together into the PPE-based dissolution liquid of Step (c), and then performing adequate agitation until the LR-PPE and the processing aids are evenly dispersed throughout the dissolution liquid;

(e) cooling the PPE-based dissolution liquid of Step (d) to a temperature ranging between 42° C. and 80° C., and adding the second solvent of Step (b) into the PPE-based dissolution liquid of Step (d) under a weight ratio of the first solvent to the second solvent ranging between 0.10 and 2.0, to cause the PPE to wrap around the processing aids occurred constantly in the PPE-based dissolution liquid; and (f) cooling the PPE-based dissolution liquid of Step (e) to a temperature ranging between 0° C. and 40° C., so as to obtain a PPE microspore dispersion that is suitable for impregnation processes performed below 40° C.

The first solvent which is capable of dissolving the HM-PPE at 45-110° C. according to the present invention is selected from benzene, methylbenzene, dimethylbenzene, trimethylbenzene and any combinations thereof.

The second solvent which is incapable of dissolving the HM-PPE according to the present invention is selected from dimethyl ketone, methyl ethyl ketone, methyl isobutyl ketone, and any combinations thereof.

Those processing aids chosen for use in making the PPE microspore dispersion according to the present invention are selected from a polybutadiene resin, a flame retardant, a filler, a crosslinking agent, an initiator, and any combinations thereof;

The PPE microspore dispersion according to the present invention has the following unexpected effects:

1. The PPE microspore dispersion improves to allow fibrous material (such as glass fabrics) to be impregnated below 40° C., thereby a high-temperature impregnation equipment for using in making a prepreg under working temperature of greater than 40° C. is no longer needed, so that the PPE microspore dispersion of the invention has benefits related to safety and economics; and 2. Since each HM-PPE microspore has both the HM-PPE and the processing aid mixed with high homogeneity, the PPE microspore dispersion if used in making a high-frequency copper clad laminates thereby contributes to the resultant high-frequency copper clad laminates excellent in physical properties, including low dielectric constant (Dk), low dielectric dissipation factor (Df) and high glass transition temperature (Tg) as well as high copper foil's peel strength and mechanical strength.

DETAILED DESCRIPTION OF THE PREFERRED EMBODIMENT

Figure 1:
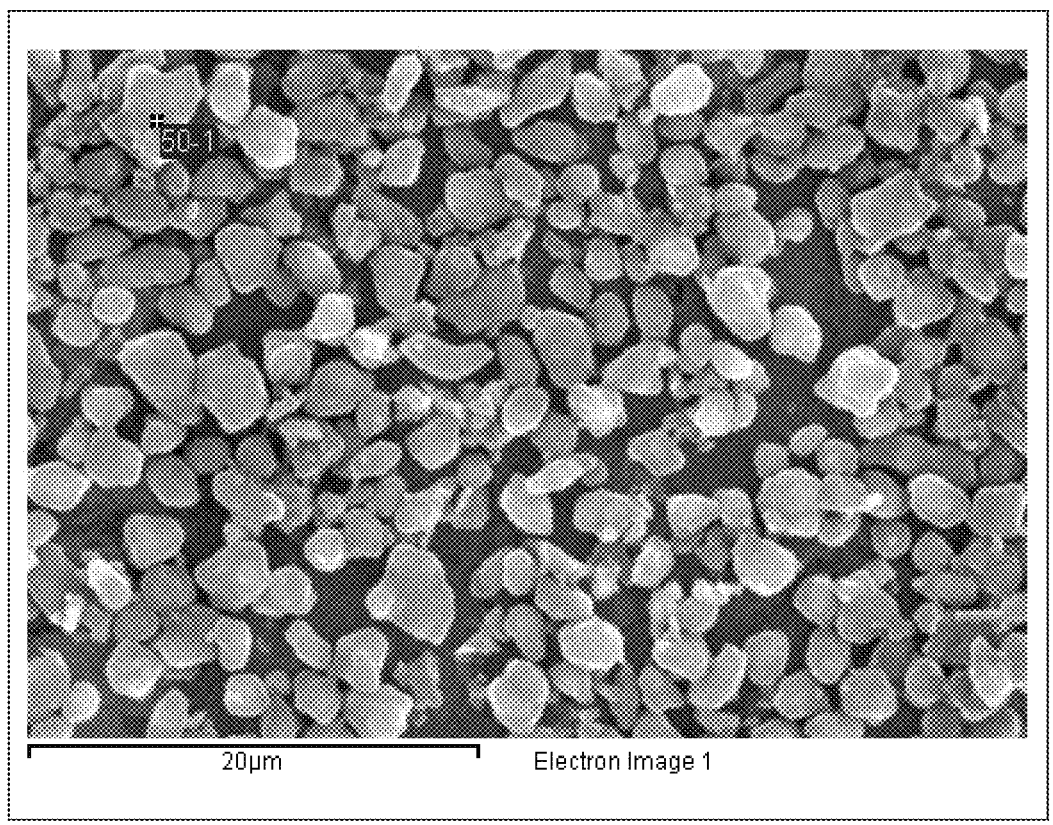
FIG. 1 is a SEM photo of PPE microspores made from Example 1, taken by a scanning electron microscope.

A process for preparing a polyphenylene ether (PPE) microspore dispersion is disclosed by the present invention to prepare a novel PPE microspore dispersion having a specific structural feature regarding that the microspore(s) is/are not only evenly dispersed in the PPE microspore dispersion, but also formed through allowing high-molecular weight PPE (HM-PPE) to wrap around processing aids which are chosen as additives for preparing the polyphenylene ether (PPE) microspore dispersion of the present invention, and, for clarity, such a PPE microspore dispersion is hereinafter referred to as "PPE microspores" of the present invention.

The disclosed PPE microspores of the present invention is so suited for using in making a prepreg formed by letting fibrous material or glass fabrics be impregnated with the PPE microspores of the present invention at temperature of below 40° C., thereby a prior known process for producing a prepreg by using of high-temperature impregnation equipment under working temperature of greater than 40° C. is capable of being eliminated and no longer required.

As shown in Table 1, polyphenylene ether (PPE) dissolves differently in different solvents at different temperature ranges.

TABLE 1

| Solvent Concentration | aromatic solvent (rich solvent) | | ketone-, alcohol- or amide-based solvent (lean solvent) |
|---|---|---|---|
| greater than 10 wt % | 45-110° C. | 0-40° C. | 0-80° C. |
| HM-PPE having Mn greater than 12,000 g/mole | dissolved | swelled paste (not flowable) | not dissolved |
| LR-PPE having Mn less than 6,000 g/mole | dissolved | dissolved | dissolved |

As can be seen in Table 1, HM-PPE can dissolve in the aromatic solvent (hereinafter abbreviated as "rich solvent" or "first solvent") at 45-110° C., but does not dissolve in the ketone-based solvent, alcohol-based solvent or amide-based solvent (hereinafter abbreviated as "lean solvent" or "second solvent") at 0-80° C. On the contrary, LR-PPE can easily dissolve in the aromatic solvent, ketone-based solvent, alcohol-based solvent or amide-based solvent.

The disclosed method is thus based on the characteristics of HM-PPE, and employs unique combinations of rich solvent/lean solvent weight ratio, feeding time and reaction temperature to prepare the disclosed PPE microspore dispersion.

In particularly, the process for preparing PPE microspores as provided by the present invention involves the following key technologies:

1. Use of a first solvent (or called rich solvent) that can dissolve HM-PPE at 45-110° C., such as an aromatic solvent;
2. Use of a second solvent (or called lean solvent) that dose not dissolve HM-PPE at 0-80° C., such as a ketone-based solvent, an alcohol-based solvent or an amide-based solvent;

3. Addition of the processing aids (such as a flame retardant, a filler and mixture), only made when HM-PPE has been dissolved in the first solvent (or rich solvent) and forms a HM-PPE solution;
4. Addition of the second solvent (or lean solvent), only made when the processing aids have been added into the HM-PPE solution and the HM-PPE solution is cooled so that HM-PPE is separated; and
5. Agitate that makes the separated HM-PPE evenly mix with the processing aids, so that HM-PPE interlaces with insoluble matters in the processing aids, and eventually form PPE microspores in which HM-PPE wraps the processing aids.

Based on the foregoing technologies, the disclosed process for preparing a PPE microspore dispersion, comprises the following steps:
a) selecting a high-molecular polyphenylene ether (HM-PPE) that has a number-average molecular weight (Mn) of 12,000-30,000 g/mole as a reactant;
b) dissolving the PPE reactant of Step (a) in a first solvent (or rich solvent) at a temperature of 45-110° C., preferably 50-100° C., and more preferably 60-90° C., so as to form a PPE-based dissolution liquid;
c) after the HM-PPE in the PPE-based dissolution liquid is completely dissolved and becomes flowable, adding a low-molecular polyphenylene ether (LR-PPE) that has a number-average molecular weight (Mn) of 800-6,000 g/mole and processing aids into the PPE-based dissolution liquid of Step (b), and keeping adequate agitation unit 1 the processing aids are evenly dispersed throughout the solution, so as to form a PPE-based dissolution liquid of the the dispersed phase;
d) cooling the PPE-based dissolution liquid of Step (c) to 42-80° C., preferably 45-75° C., and more preferably 50-70° C., and slowly adding a second solvent (or lean solvent) thereto, so that a weight ratio of the first solvent (or rich solvent) to the second solvent (or lean solvent) ranging between 0.1 and 2.0, preferably ranging between 0.15 and 1.5, and more preferably ranging between 0.2 and 1.2, at which time the HM-PPE is separated and consistently, evenly wraps around the processing aids to form PPE microspores, thereby starting to become the PPE microspore dispersion; and
e) after completion of addition of the second solvent (or lean solvent), cooling the PPE microspore dispersion to 0-40° C., preferably 0-38° C., and more preferably 5-35° C., thereby obtaining the PPE microspore dispersion suitable for impregnation processes at the room temperature.

The particle size of the PPE microspores depends on the particle sizes of the flame retardant and the filler chosen as the processing aids. For instance, when the processing aids used are flame-resisting and fillers whose average particle size (D50) is about 2 μm, the average particle size (D50) of the PPE microspores is about 3.6 μm.

The disclosed PPE microspore dispersion contains a solid content composed of the PPE microspores and non-PPE microspores, which takes 30-70% by weight of the overall dispersion (hereinafter "wt %" is shorted into "%"), preferably 35-60%, and more preferably 40-50%. Among the PPE microspores dispersed in PPE microspore dispersion, more than 70% by weight of the total PPE microspores, preferably more than 80% and more preferably more than 90%, have a particle size of 0.5-20 μm. In the PPE microspores, the HM-PPE component takes more than 80% by weight of the PPE microspore, preferably more than 85%, and more preferably more than 90%, while the rest is the processing aid componenet.

The disclosed PPE microspore dispersion of the present invention has a viscosity of 10-400 Cps, preferably 20-200 Cps, and more preferably 30-150 Cps.

As used in the present invention, the HM-PPE has a number-average molecular weight (Mn) of preferably 12,000-30,000 g/mole, and more preferably 14,000-25,000 g/mole.

HM-PPEs having a number-average molecular weight (Mn) greater than 12,000 g/mole contribute to high-frequency copper clad laminates having good electrical properties and glass transition temperature (Tg). For making high-frequency copper clad laminates, a HM-PPE having a number-average molecular weight (Mn) lower than 30,000 g/mole may be used. Under typical heat-press temperature and pressure, this material displays lower viscosity, thereby providing desirable formability. In addition, the HM-PPE having its Mn smaller than 30,000 g/mole can be dissolved in aromatic solvents below 110° C. to form the disclosed PPE microspore dispersion and the resultant PPE microspores are of high homogeneity.

In the present invention, the LR-PPE preferably has a number-average molecular weight (Mn) of 800-6,000 g/mole, and more preferably 1,000-5,000 g/mole.

LR-PPEs having a number-average molecular weight (Mn) smaller than 6,000 g/mole contribute to high-frequency copper clad laminates having good impregnation and formability, while LR-PPEs having a number-average molecular weight (Mn) greater than 800 g/mole contribute to high-frequency copper clad laminates having good electrical properties, heat resistance, and mechanical properties.

In the present invention, the first solvent (or rich solvent) used is selected from benzene, methylbenzene, dimethylbenzene, trimethylbenzene and any combinations thereof. Perferably, the first solvent (or rich solvent) is selected from methylbenzene or dimethylbenzene alone, or a combination of methylbenzene and dimethylbenzene.

In the present invention, the second solvent (or lean solvent) used is selected from C3-C8 ketone-based solvents, C1-C8 alcohol-based solvents, C3-C8 amide-based solvents and mixtures thereof. Perferably, the second solvent (or lean solvent) is a C3-C8 ketone-based solvent or a C3-C8 amide-based solvent alone for their better dispersing capability and proccessability. Therein, the C3-C8 ketone-based solvent is selected from dimethyl ketone, methyl ethyl ketone, methyl isobutyl ketone and a mixture thereof. The C1-C8 alcohol-based solvent is selected from methanol, ethanol, propanol, butanol, pentanol, hexanol and a mixture thereof. The C3-C8 amide-based solvent is selected from dimethylformamide, methylacetamide, diethylamide and a mixture thereof.

The processing aids are selected from polybutadiene resin, flame retardants, fillers, crosslinking agents, initiators and any combinations thereof. As the polybutadiene resin contains a vinyl component greater than 70 wt %, it provides a large number of unsaturated vinyl groups highly required during curing and crosslinking and helps increase crosslink density, making the prepregs and the resultant circuit substrates made using the material of the present invention have good heat resistance. The polybutadiene resin has its molecular weight (Mw) of 1,000-10,000 g/mol.

The flame retardant serves to restrain combustion and is selected from brominated flame retardants, phosphate-ester flame retardants, ammonium polyphosphate flame retardants, melamine polyphosphate flame retardants, melamine cyanurate flame retardants, phosphazene flame retardants and inorganic metal-based flame retardants.

The filler has an average particle size of 0.01-20 microns, and serves to maintain dimensional stability and mechanical strength of the resultant copper clad laminates. The filler is selected from $SiO_2$, $Al(OH)_3$, $Al_2O_3$, $TiO_2$, $Mg(OH)_2$ and $CaCO_3$.

The crosslinking agent is a monomer having two or more unsaturated groups in its molecules. The crosslinking agent is preferably TAIC as it is better compatible to PPE.

The initiator serves to speed up crosslink reaction and facilitate hardening. The initiator used herein is preferably 2,5-di(tert-butylperoxy)-2,5-dimethyl-3-hexyne or 2,5-dimethyl-2,5-di(tert- butylperoxy)hexane (DHBP).

Where desirable, the disclosed PPE microspore dispersion may be prepared with a proper amount of additives added. The additives may include thermoplastic resins, heat stabilizers, anti-oxidants, UV-absorbing agents, surfactants, smoothing agents and polymers.

The disclosed PPE microspore dispersion has the following beneficial effects, making it a perfect material for high-frequency copper clad laminates that feature for excellent electrical properties:

1. The PPE microspore dispersion allows fibrous material or glass fabrics to be impregnated at temperature of below 40° C., thereby eliminating the need of using high-temperature (greater than 40° C.) impregnation equipment, and providing benefits related to safety and economics; and
2. Since each HM-PPE microspore has both the HM-PPE and the processing aid mixed with high homogeneity, the PPE microspore dispersion if used in making a high-frequency copper clad laminates thereby contributes to the resultant high-frequency copper clad laminates excellent in physical properties, including low dielectric constant (Dk), low dielectric dissipation factor (Df) and high glass transition temperature (Tg) as well as high copper foil's peel strength and mechanical strength.

While some examples will be described below for further illustrating the present invention, it is to be understood that the scope of the present invention shall not be limited to these examples. PPE microspore dispersions prepared as described in Examples and Comparative Examples given below, and copper clad laminates made using these PPE microspore dispersions were measured and analyzed following the protocols as follows.

Preparation of PPE Microspore Dispersion:

An HM-PPE and a first solvent (or rich solvent) are mixed into a solution at 45-110° C., preferably 50-100° C., more preferably 60-90° C. The tangential velocity at the terminal of the agitating vane is above 3 m/s for addition of processing aids (a polybutadiene resin, a crosslinking agent, a flame retardant, a filler and an initiator, etc.), the LR-PPE is agitated until it is evenly dispersed throughout the solution. The solution is then cooled to 42-80° C., preferably 45-75° C., more preferably 50-70° C., and a second solvent (or lean solvent) is added. At this time, PPE is consistently separated and wraps around the processing aids, and the microspore dispersion starts to present. After addition of the second solvent (or lean solvent) is completed, the PPE microspore dispersion is cooled to 0-40° C.

Analysis of Microspores:

10 g of prepared dispersion having a given composition is processed by centrifugal sedimentation. The upper clear liquid is collected from the solid-liquidmixture system. Then 50 g of methyl ethyl ketone (MEK) is added into and agitated with the solid phase. Centrifugal solid-liquid separation is performed. The upper clear liquid is collected. Again, 50 g of MEK is added into and agitated with the solid phase. Centrifugal solid-liquid separation is performed. All the collected clear liquid is analyzed for its solid content and composition, so as to obtain the weight of each component (namely the weight of each liquid component). 100 g of methylbenzene is added to the lower solid microspores layer, and heated to 100° C. with adequate agitation to have the resin microspores dissolve. Then the product is filtered and analyzed for its solid content and composition, so as to obtain the weight of each component (namely the weight of each microspore component).

Methods for analyzing dispersion microspores and measuring laminates:

1. Analysis of PPE microspores' diameter:
    A particle size analyzer (Model: Mastersizer 3000) is used to measure the distribution porporation of PPE microspores' particle sizes, with the meaning range of 0.01-3,500 μm.
2. Observation on PPE microspores:
    The dispersion is diluted 50 times by ketone, and sampled and dropped on glass for drying. A scanning electron microscope (SEM, HITACHI S-3400N) is used to observe the specimens at different magnifications.
3. Elemental analysis of PPE microspores:
    The dispersion is diluted 50 times by ketone, and sampled and dropped on glass for drying. An energy dispersive spectroscopy (EDS, HORIBA X-Max) is used for elemental analysis of PPE microspores, so as to verify whether HM-PPE wraps tightly the processing aids' insoluble matters.
4. Measurement of viscosity:
    A viscometer (from Schott, Germany) is used to measure PPE microspore dispersion's viscosity.
5. Measurement of PPE resin's molecular weight:
    A given amount of PPE resin dissolves in a tetrahydrofuran (THF) solvent to form a 1% solution. The solution is heated to become clear for GPC (gel permeation chromatography) analysis. The PPE resin molecular weight is determined by calculating its character peak area. A calibration line for analysis is established by marking multiple points on standard polystyrene products with different molecular weights. After the calibration line is established, the molecular weights of the article to be measured can be determined
6. Determination of each PPE molecule's average phenolic hydroxyl groups (the number of OH groups):
    Each PPE molecule's average OH number is equal to the ratio of the number of hydroxyl groups to the number-average molecular weight (Mn).
    PPE is dissolved in dichloromethane solution, and tetramethyl ammonium hydroxide is added to prepare a specimen. A UV spectrometer is used to test the numbers of hydroxyl groups with a wavelength of 318 nm.
7. Measurement of glass transition temperature (Tg, ° C.):
    A differential scanning calorimeter (DSC, Model: TA2100) is used to determine the glass transition temperatures of the laminate and PPE.
8. Analysis of water absorbency (%):
    Water is heated in a 2 atm pressure cooker to 120° C. A specimen is placed in the pressure cooker for 30 minutes. The specimen's weight variation regarding before and after water absorption is recorded.
9. Analysis of resistance to 288° C. solder heat (second):
    A specimen is heated in a pressure cooker for 120 minutes at 120° C., 2 atm, and then immersed into a solder furnace at 288° C. The time it takes for the specimen to be delaminated is recorded.
10. Test for copper foil's peel strength (lb/in):
    Peel strength between copper foil and the circuit substrate is tested.

11. Test for Dielectric constant Dk (3 GHz):
    A dielectric Analyzer (Model: HP Agilent E4991A) is used to test for Dielectric constant Dk at 3 GHz.
12. Test for dielectric dissipation factor Df (3 GHz):
    A dielectric analyzer (Model: HP Agilent E4991A) is used to test for dielectric dissipation factor Df at 3 GHz.

EXAMPLES

Regarding preparation of samples of PPE-A1 to PPE-A6 as well as PPE-B1 to PPE-B3, each has its specification shown in Table 2.

Preparation of PPE-A1

For reaction, 1.5 kg of 2,6-dimethylphenol (2,6-DMP) and 0.040 kg of tetramethyl bisphenol A (TMBPA) were mixed as a reactant.

The reaction solvent used was 10 kg of methylbenzene, and a Co-Amine complex was used as a catalyst (CuBr2: 2.2 g, n-butylamine: 32 g, N,N-dimethylbutylamine: 60 g, dibutylamine: 21 g, dibutylethylenediamine: 5.8 g, surfactant: 4 g).

The 2,6-DMP and TMBPA were mixed and dissolved in the methylbenzene solvent to form a reaction liquid. The reaction liquid was placed into a 30-L reactor equipped with an agitator. Nitrogen and oxygen were introduced separately, so that the gaseous oxygen concentration in the reactor was controlled below the reaction solvent's limiting oxygen concentration (LOC), and pressure was held at 6 kg/cm$^2$. Then the agitator in the reactor was activated, and the temperature was controlled at 25° C. During reaction, oxygen was replenished whenever it was consumed. Reaction pressure and gaseous oxygen concentration were held below 6 kg/cm$^2$ and LOC, respectively. Monitoring was made to the PPE's molecular weight and the reaction liquid's viscosity throughout the reaction. When the PPE's number-average molecular weight (Mn) reached of 12,000±500 g/mole, the reaction was ended (oxygen was cut and nitrogen was supplied instead).

The reaction liquid (or crude product) was cooled to the room temperature and then the solvent was added with twice amount of the reaction liquid (or crude product) to dilute the PPE in both concentration and viscosity. Afterward, 0.1% aqueous solution of ethylenediaminetetraacetic acid (CAS: 60-00-4, for short EDTA) was used as a chelating agent to remove copper ions and separate the water layer in an extraction process. The solution was then heated to 75° C. before 0.4 g of tetrabutyl ammonium bromide (TBAB) was added as a phase-transfer catalyst. Afterward, 8.8 g of 45 wt % aqueous NaOH solution was added and reaction was performed for 1 hour (for turning phenolic terminal groups into sodium salts). 15.2 g of chloromethane styrene (CMS) was added drop-wise into the reaction liquid. After the drop-wise addition (over 1 hour), reaction was performed for 10 hours and the reaction liquid was cooled to the room temperature. Methanol (5 times as weight as the reaction liquid) was used to separate PPE from the reaction liquid, and the PPE was filtered and dried.

The polyphenylene ether (PPE-A1) so made was provided with a number-average molecular weight (Mn) of 12,063 g/mole, and its each molecule's average OH number was 0.95.

Preparation of PPE-A2

Similar to preparation of PPE-A1, except the reactant was 1.5 kg of 2,6-DMP and 0.028 kg of TMBPA instead, the phase-transfer catalyst was 0.5 g of tetrabutyl ammonium bromide (TBAB), 45 wt % aqueous NaOH solution was 5.8 g, and CMS was 10.2 g.

When the PPE in the reaction liquid having a number-average molecular weight (Mn) of 14,000±500 g/mole was reached, the reaction was ended.

At last, the polyphenylene ether (PPE-A2) separated from the reaction liquid had a number-average molecular weight (Mn) of 14,324 g/mole, and its each molecule's average OH number was 0.97.

Preparation of PPE-A3

Similar to preparation of PPE-A1, except reactant was 1.5 kg of 2,6-DMP and 0.15 kg of AMP. When the PPE in the reaction liquid having a number-average molecular weight (Mn) of 18,000±500 g/mole was reached, the reaction was ended.

At last, the polyphenylene ether (PPE-A3) separated from the reaction liquid had a number-average molecular weight (Mn) of 18,491 g/mole, and its each molecule's average OH number was 0.91.

Preparation of PPE-A4

The procedure was similar to preparation of PPE-A1, except the reactant was only 1.5 kg of 2,6-DMP. When the PPE in the reaction liquid having a number-average molecular weight (Mn) of 23,000±500 g/mole was reached, the reaction was ended.

At last, the polyphenylene ether (PPE-A4) separated from the reaction liquid had a number-average molecular weight (Mn) of 23,167 g/mole, and its each molecule's average OH number was 0.92.

Preparation of PPE-A5

The procedure was similar to preparation of PPE-A4, except when PPE in the reaction liquid had its number-average molecular weight (Mn) of 28,000±500 g/mole was reached, the reaction was ended.

At last, the polyphenylene ether (PPE-A5) separated from the reaction liquid had a number-average molecular weight (Mn) of 28,424 g/mole, and its each molecule's average OH number was 0.96.

Preparation of PPE-A6

The procedure was similar to preparation of PPE-A4, except the reaction was ended when the PPE having a number-average molecular weight (Mn) of 32,000±500 g/mole was reached.

At last, the polyphenylene ether (PPE-A6) separated from the reaction liquid had a number-average molecular weight (Mn) of 32,197 g/mole, and its each molecule's average OH number was 0.94.

Preparation of PPE-B1

In a 2-L flask, 215 g of PPE-A5 (Mn=28,424 g/mole) and 500 g of methylbenzene were placed in and heated to 90° C. Agitation was performed unit 1 the PPE-A5 prepared in advance was dissolved. After 48.6 g of bisphenol A (BPA) and 31.4 g of benzoyl peroxide (BPO) were introduced, reaction was performed for 6 hours. The reactant was cooled to 50° C. and extracted using lye and pure water for several times as purification. At this time, PPE in the reaction liquid had a number-average molecular weight (Mn) of 2,020 g/mole, and its each molecule's average OH number was 1.89.

The reaction liquid was then heated to 75° C., before 0.25 g of tetrabutyl ammonium bromide (TBAB) as a phase transfer catalyst was introduced. Afterward, 39.9 g of 45 wt % aqueous NaOH solution was added and reaction was performed for 1 hour (for turning phenolic terminal groups into sodium salts). 68.6 g of chloromethane styrene (CMS) was added drop-wise into the reaction liquid. After the drop-wise addition (over 1 hour), reaction was performed for 10 hours and the reaction liquid was cooled to the room temperature. Methanol (5-time as weight as the reaction liquid) was used to separate PPE from the reaction liquid, and the PPE was filtered and dried.

At last, the polyphenylene ether (PPE-B1) separated from the reaction liquid had a number-average molecular weight (Mn) of 2,133 g/mole, and its molecule's average OH number was smaller than 0.01.

Preparation of PPE-B2

The procedure was similar to preparation of PPE-B 1, except bisphenol A (BPA) was replaced with 26.9 g, 22.2 g of 45 wt % aqueous NaOH solution, and the weight of CMS was changed to 38.1 g.

At last, polyphenylene ether (PPE-B2) separated from the reaction liquid had a number-average molecular weight (Mn) of 3,860 g/mole, and its molecule's average OH number was than 0.01.

Preparation of PPE-B3

The procedure was similar to preparation of PPE-B 1, except 18.0 g of bisphenol A (BPA), 15.2 g of 45 wt % aqueous NaOH solution and 26.1 g of CMS were used instead.

At last, polyphenylene ether (PPE-B3) separated from the reaction liquid had a number-average molecular weight (Mn) of 5,632 g/mole, and its molecule's average OH number was smaller than 0.01.

TABLE 2

| | Item | Functional Group Structure | Number-Average Molecular Weight (Mn, g/mole) | Average OH Number (mole/mole) |
|---|---|---|---|---|
| HM-PPE | PPE-A1 | Alkenyl groups at two ends | 12,863 | 0.95 |
| | PPE-A2 | | 14,324 | 0.97 |
| | PPE-A3 | Alkenyl groups on side chains | 18,491 | 0.91 |
| | PPE-A4 | No alkenyl groups | 23,167 | 0.92 |
| | PPE-A5 | | 28,424 | 0.96 |
| | PPE-A6 | | 32,197 | 0.94 |
| LR-PPE | PPE-B1 | Alkenyl groups at two ends | 2,133 | smaller than 0.01 |
| | PPE-B2 | | 3,860 | smaller than 0.01 |
| | PPE-B3 | | 5,632 | smaller than 0.01 |

Preparation of PPE Microspore Dispersion

Examples 1-2

The formula used is as shown in Table 3. HM-PPE and methylbenzene (or dimethylbenzene) chosen as a first solvent (or rich solvent) were placed into a three-neck flask subject to consistent agitation (agitation performed throughout the process, with the tangential velocity at the terminal of the agitating vane kept above 3 m/s). The solution was then warmed to 45° C. With certain believe that HM-PPE fully dissolved, the processing aids and LR-PPE were added. The added processing aids were chosen to include a polybutadiene resin, a TAIC as a crosslinking agent, a BT-93 (or MPP) as a flame retardant, a $SiO_2$ (D50=2 μm) as a filler, and DCP as an initiator. Agitation was maintained to make even dispersion in the solution. When the solution was cooled to 42° C., ethanol (or methyl ethyl ketone (MEK) or dimethylformamide (DMF)) was added (10 g/min) as a second solvent (or lean solvent) into the three-neck flask while the temperature was decreased at a rate of 1° C. per minute. During dropwise addition of the second solvent (or lean solvent) and cooling, PPE was consistency separated to evenly wrap around the processing aids, thereby forming microspore dispersion.

After addition of the second solvent (or lean solvent) was completed, the microspore dispersion was cooled to 25° C. for Example 1 or cooled to 32° C. for Example 2, respectively, thereby obtaining flowable PPE microspore dispersion with even microspore dispersion.

Figure 2:
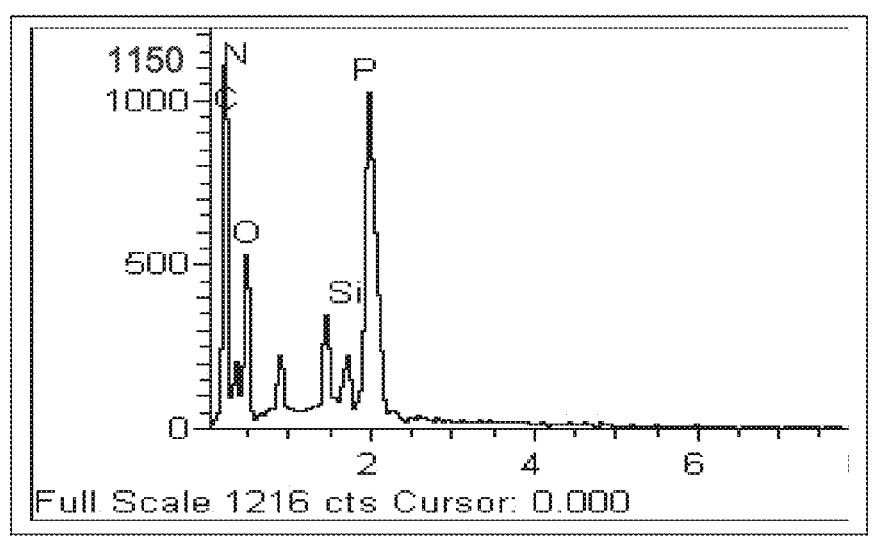
FIG. 2 is an EDS spectrum taken by an energy dispersive spectroscopy and used for elemental analysis or chemical characterization of PPE microspores made from Example 1.

And, a SEM photo and an EDS analysis were taken for the PPE microspores of Example 1 and shown in FIG. 1 and FIG. 2, respectively.

Examples 3-6

The formula used is as shown in Table 3. HM-PPE and the first solvent (or rich solvent) were placed into a three-neck flask subject to consistent agitation (agitation performed throughout the process, with the tangential velocity at the terminal of the agitating vane kept above 3 m/s). The solution was then warmed to 60° C. With certain believe that HM-PPE fully dissolved, the processing aids and LR-PPE were added. Agitation was maintained to make even dispersion in the solution. When the solution was cooled to 50° C., the second solvent (or lean solvent) was added (10 g/min) into the three-neck flask while the temperature was decreased at a rate of 1° C. per minute. During dropwise addition of the second solvent (or lean solvent) and cooling, PPE was consistency separated to evenly wrap around the processing aids, thereby forming microspore dispersion.

After addition of the second solvent (or lean solvent) was completed, the microspore dispersion was respectively cooled to 18° C. for Example 3, cooled to 12° C. for Example 4, cooled to 3° C. for Example 5, and cooled to 40° C. for Example 6, thereby obtaining flowable PPE microspore dispersion with even microspore dispersion.

Figure 3:
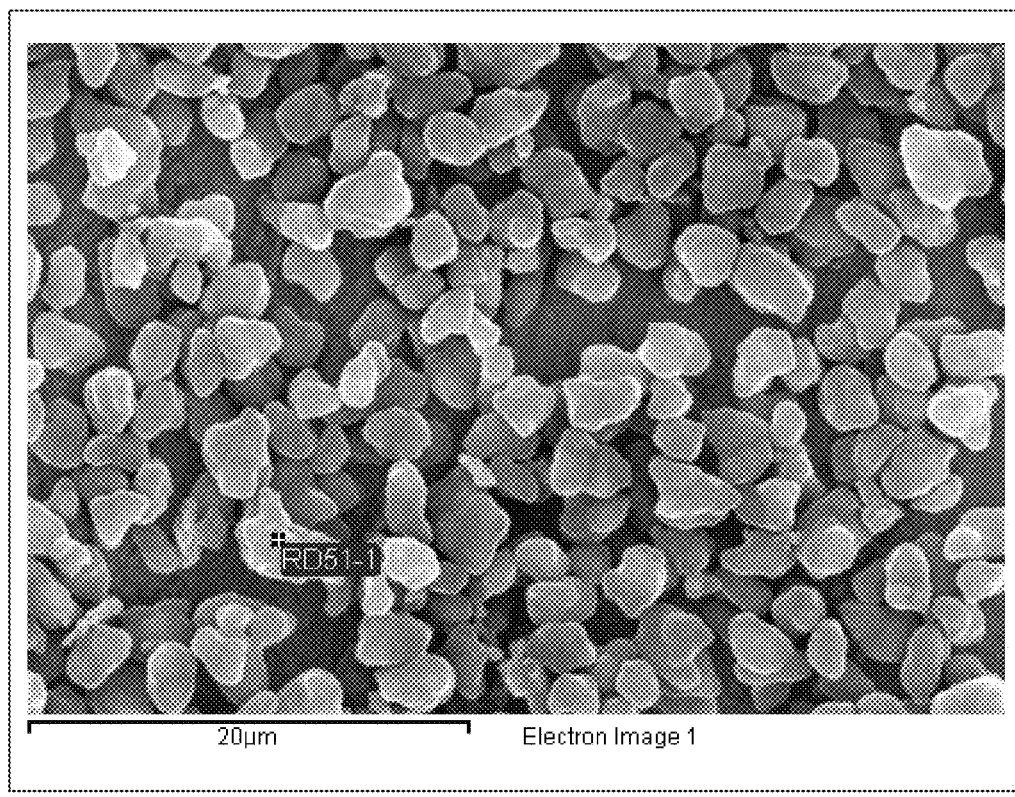
FIG. 3 is a SEM photo of PPE microspores made from Example 5, taken by a scanning electron microscope.
Figure 4:
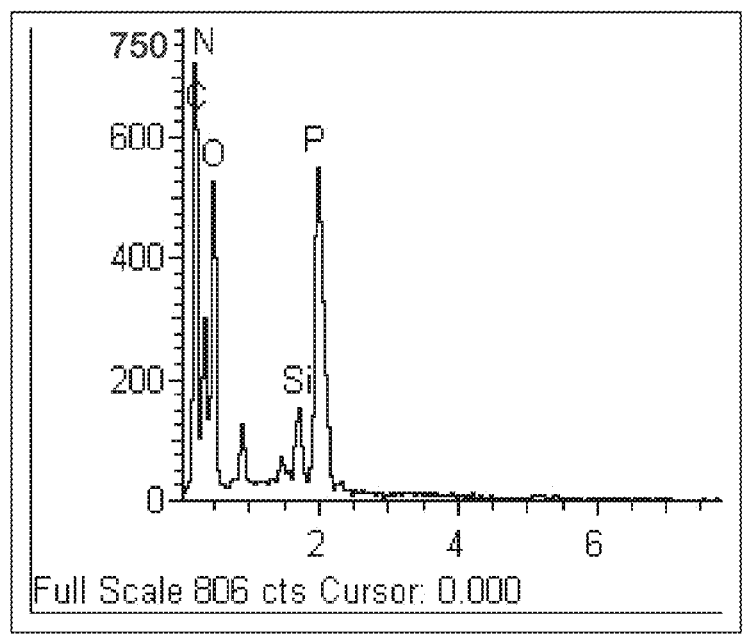
FIG. 4 is an EDS spectrum taken by an energy dispersive spectroscopy and used for elemental analysis or chemical characterization of PPE microspores made from Example 5.
Figure 5:
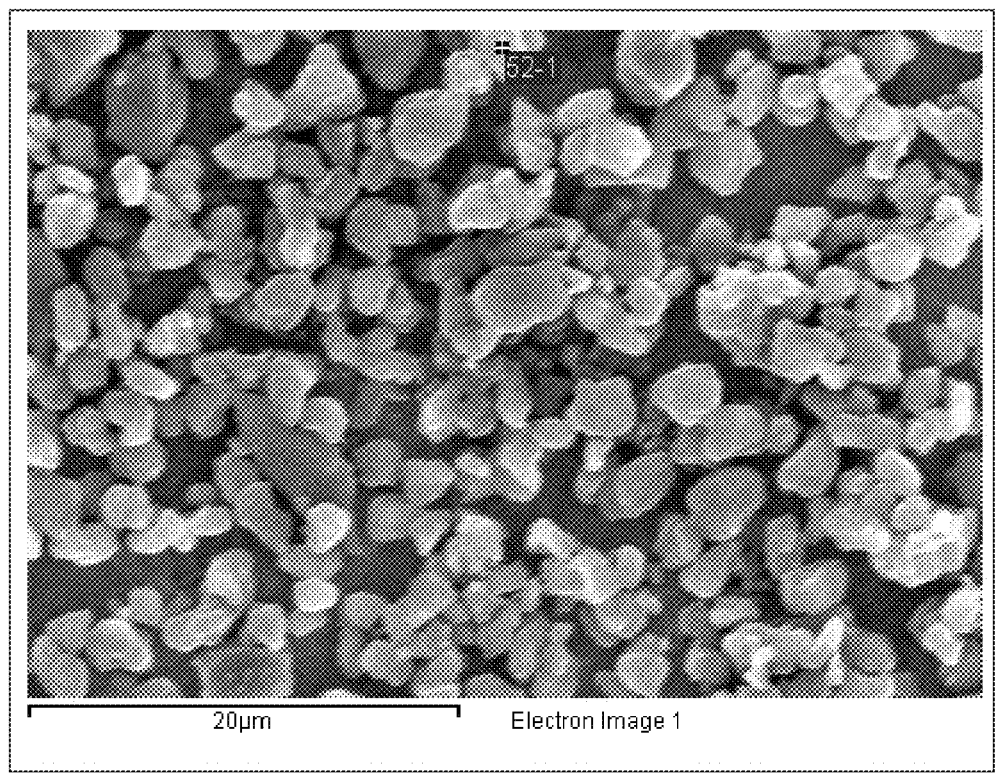
FIG. 5 is a SEM photo of PPE microspores made from Example 9, taken by a scanning electron microscope.
Figure 6:
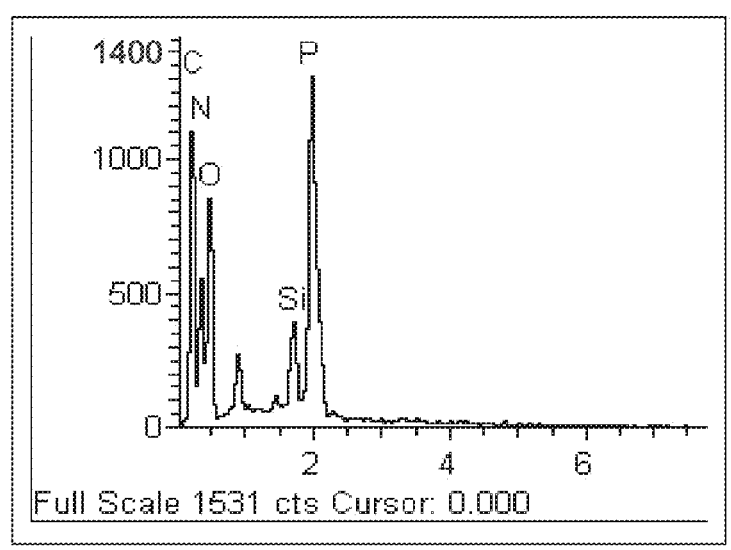
FIG. 6 is an EDS spectrum taken by an energy dispersive spectroscopy and used for elemental analysis or chemical characterization of PPE microspores made from Example 9.
Figure 7:
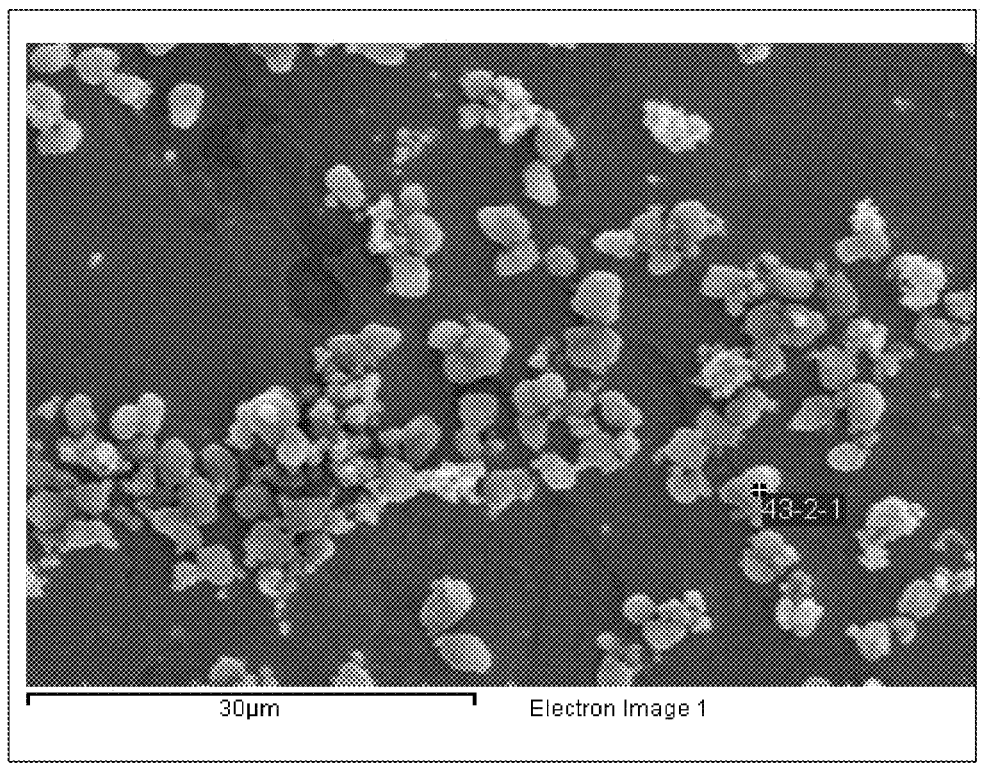
FIG. 7 is a SEM photo of PPE microspores made from Example 10, taken by a scanning electron microscope.
Figure 8:
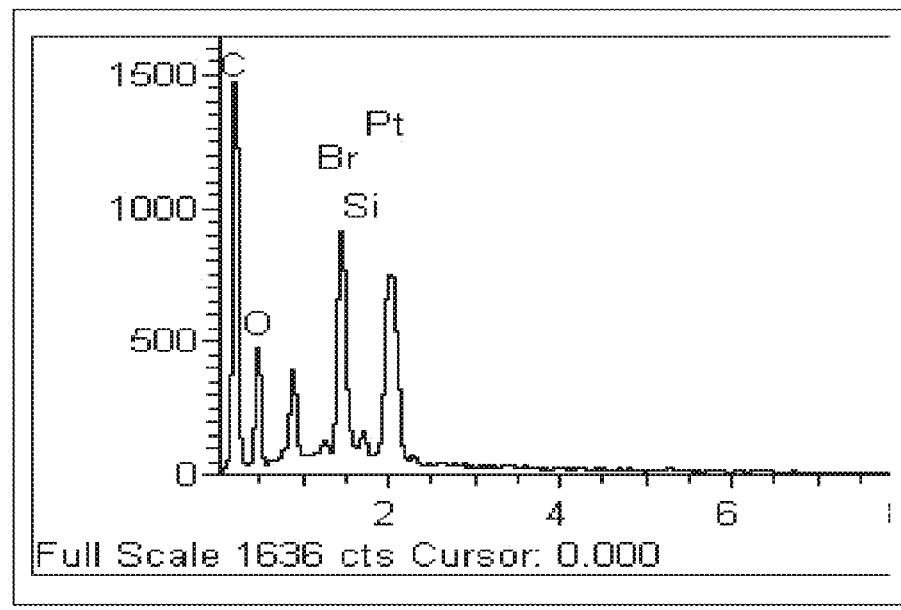
FIG. 8 is an EDS spectrum taken by an energy dispersive spectroscopy and used for elemental analysis or chemical characterization of PPE microspores made from Example 10.
Figure 9:
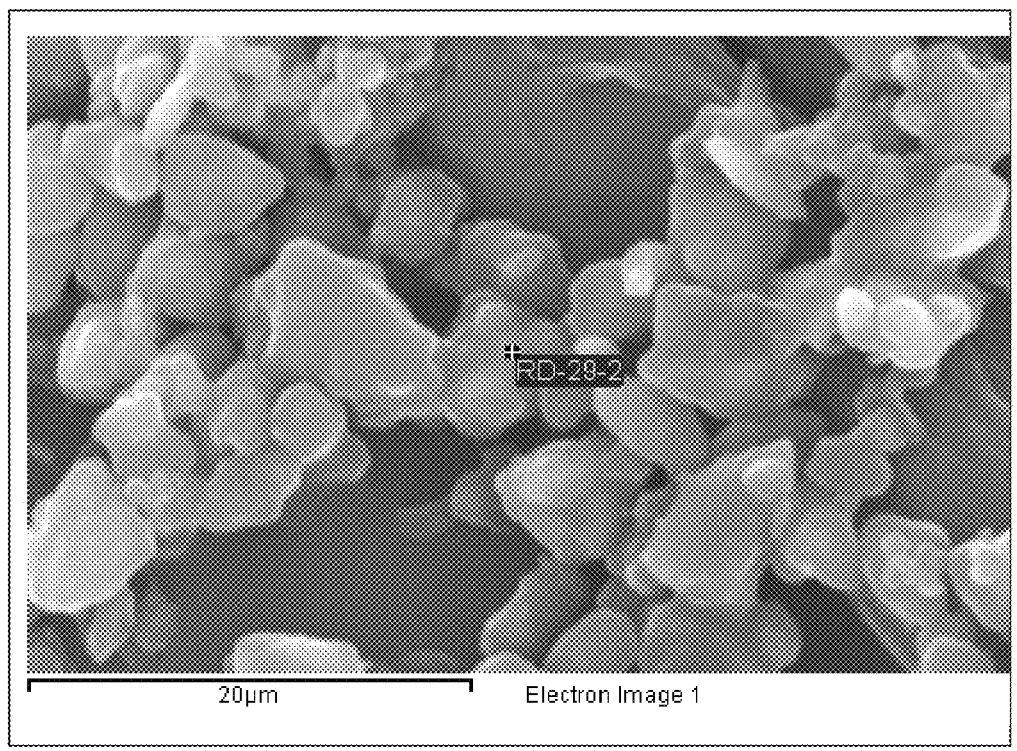
FIG. 9 is a SEM photo of PPE microspores made from Example 12, taken by a scanning electron microscope.
Figure 10:
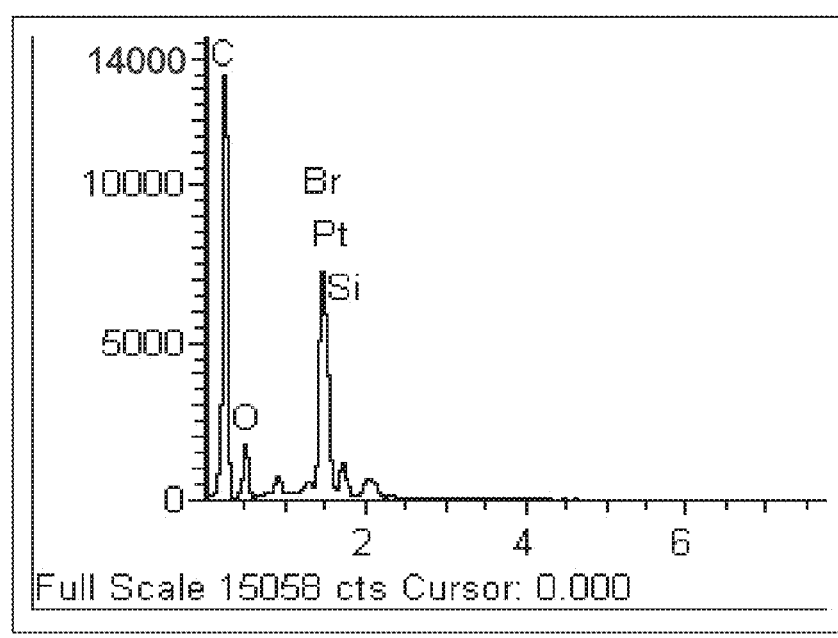
FIG. 10 is an EDS spectrum taken by an energy dispersive spectroscopy and used for elemental analysis or chemical characterization of PPE microspores made from Example 12.
Figure 11:
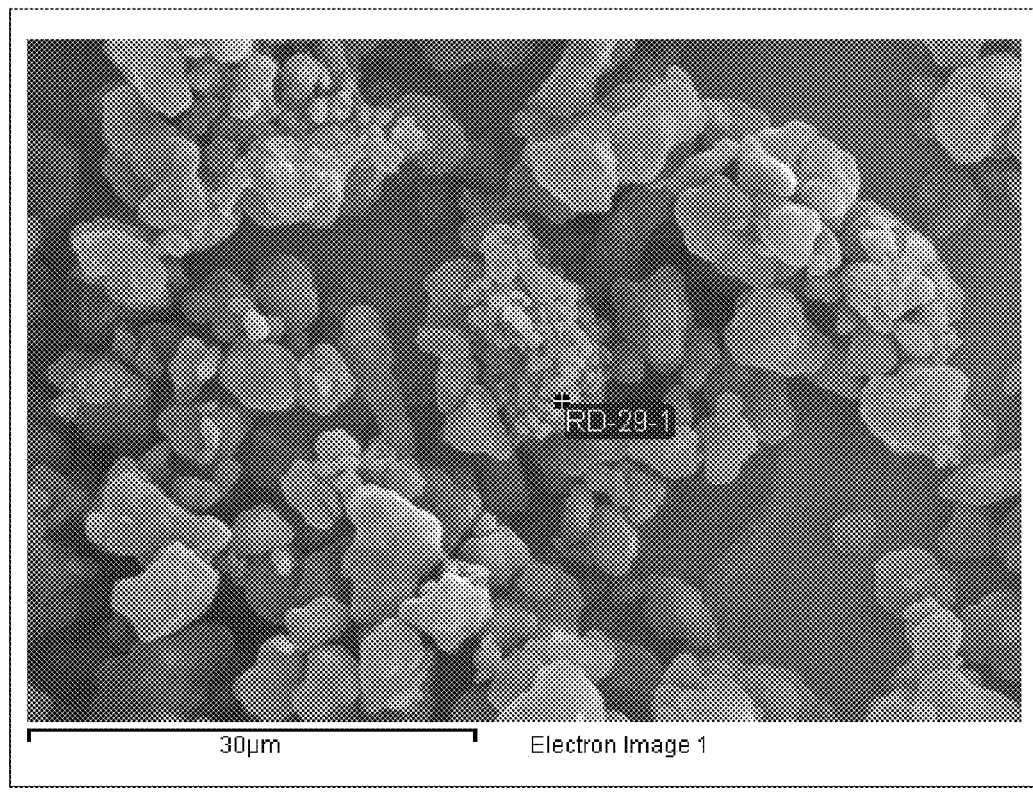
FIG. 11 is a SEM photo of PPE microspores made from Example 14, taken by a scanning electron microscope.
Figure 12:
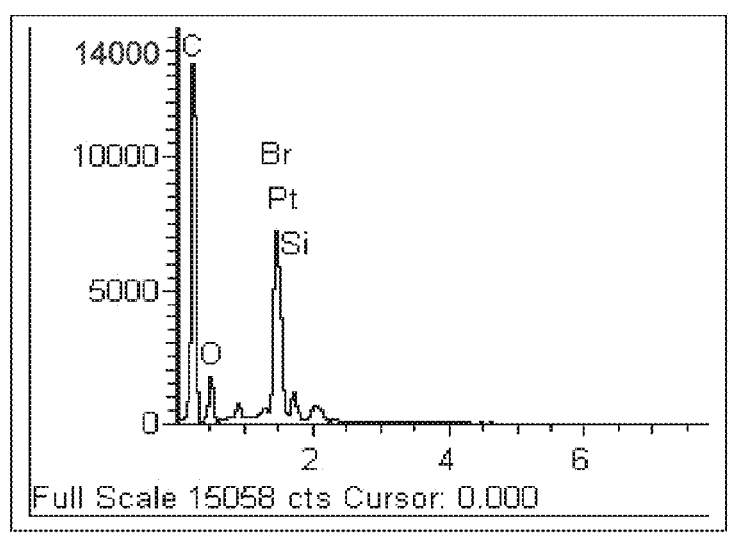
FIG. 12 is an EDS spectrum taken by an energy dispersive spectroscopy and used for elemental analysis or chemical characterization of PPE microspores made from Example 14.

And, a SEM photo and an EDS analysis were taken for the PPE microspores of Example 5 and shown in FIG. 3 and FIG. 4, respectively.

Examples 7-11

The formula used is as shown in Table 3. HM-PPE and the first solvent (or rich solvent) were placed into a three-neck flask subject to consistent agitation (agitation performed throughout the process, with the tangential velocity at the terminal of the agitating vane kept above 3 m/s). The solution was then warmed to 75° C. With certain believe that HM-PPE fully dissolved, the processing aids and LR-PPE were added. Agitation was maintained to make even dispersion in the solution. When the solution was cooled to 60° C., the second solvent (or lean solvent) was added (10 g/min) into the three-neck flask while the temperature was decreased at a rate of 1° C. per minute. During dropwise addition of the second solvent (or lean solvent) and cooling, PPE was consistency separated to evenly wrap around the processing aids, thereby forming microspore dispersion.

After addition of the second solvent (or lean solvent) was completed, the microspore dispersion was respectively cooled to 25° C. for Example 7, cooled to 27° C. for Example 8, cooled to 39° C. for Example 9, cooled to 8° C. for Example 10, and cooled to 26° C. for Example 11, thereby obtaining flowable PPE microspore dispersion with even microspore dispersion.

A SEM photo and an EDS analysis were taken for the PPE microspores of Example 9 and shown in FIG. 5 and FIG. 6, respectively; and, another SEM photo and another EDS analysis were taken for the PPE microspores of Example 10 and shown in FIG. 7 and FIG. 8.

Examples 12-16

The formula used is as shown in Table 3. HM-PPE and the first solvent (or rich solvent) were placed into a three-neck flask subject to consistent agitation (agitation performed throughout the process, with the tangential velocity at the terminal of the agitating vane kept above 3 m/s). The solution was then warmed to 110° C. With certain believe that HM-PPE fully dissolved, the processing aids and LR-PPE were added. Agitation was maintained to make even dispersion in the solution. When the solution was cooled to 80° C., the second solvent (or lean solvent) was added (10 g/min) into the three-neck flask while the temperature was decreased at a rate of 1° C. per minute. During dropwise addition of the second solvent (or lean solvent) and cooling, PPE was consistency separated to evenly wrap around the processing aids, thereby forming microspore dispersion.

After addition of the second solvent (or lean solvent) was completed, the microspore dispersion was respectively cooled to 16° C. for Example 12, cooled to 38° C. for Example 13, cooled to 22° C. for Example 14, cooled to 25° C. for Example 15, and cooled to 9° C. for Example 16, thereby obtaining flowable PPE microspore dispersion with even microspore dispersion.

A SEM photo and an EDS analysis were taken for the PPE microspores of Example 12 and shown in FIG. 9 and FIG.10, respectively; and, another SEM photo and another EDS analysis were taken for the PPE microspores of Example 14 and shown in FIG. 11 and FIG. 12.

Comparative Example 1

The formula used is as shown in Table 4. HM-PPE and the first solvent (or rich solvent) were placed into a three-neck flask subject to consistent agitation (agitation performed throughout the process, with the tangential velocity at the terminal of the agitating vane kept above 3 m/s). The solution was then warmed to 45° C. With certain believe that HM-PPE fully dissolved and when the solution was cooled to 40° C., the second solvent (or lean solvent) was added slowly (10 g/min) into the three-neck flask while the temperature was decreased at a rate of 1° C. per minute. During dropwise addition of the second solvent (or lean solvent) and cooling, PPE was consistency separated and evenly wrapped the processing aids, thereby forming microspores.

After addition of the second solvent (or lean solvent) was completed, the microspore dispersion was cooled to 15° C., and the processing aids and LR-PPE were added. The solution was continuously agitated until they were evenly dispersed in the solution, thereby obtaining flowable impregnation liquid (or varnish) with even microspore dispersion.

Comparative Example 2

The formula used is as shown in Table 4. HM-PPE and the first solvent (or rich solvent) were placed into a three-neck flask subject to consistent agitation (agitation performed throughout the process, with the tangential velocity at the terminal of the agitating vane kept above 3 m/s). The solution was then warmed to 60° C. With certain believe that HM-PPE fully dissolved and when the solution was cooled to 50° C., the second solvent (or lean solvent) was added slowly (10 g/min) into the three-neck flask while the temperature was decreased at a rate of 1° C. per minute. During dropwise addition of the second solvent (or lean solvent) and cooling, PPE was consistency separated, thereby forming microspores.

After addition of the second solvent (or lean solvent) was completed, the microspore dispersion was cooled to 40° C., and the processing aids and LR-PPE were added. The solution was continuously agitated until they were evenly dispersed in the solution, thereby obtaining flowable impregnation liquid (or varnish) with even microspore dispersion.

Comparative Examples 3-4

The formula used is as shown in Table 4. HM-PPE and the first solvent (or rich solvent) were placed into a three-neck flask subject to consistent agitation (agitation performed throughout the process, with the tangential velocity at the terminal of the agitating vane kept above 3 m/s). The solution was then warmed to 75° C. With certain believe that HM-PPE fully dissolved and when the solution was cooled to 60° C., the second solvent (or lean solvent) was added slowly (10 g/min) into the three-neck flask while the temperature was decreased at a rate of 1° C. per minute. During dropwise addition of the second solvent (or lean solvent) and cooling, PPE was consistency separated and, thereby forming microspores.

After addition of the second solvent (or lean solvent) was completed, the microspore dispersion was cooled to 32° C. for Example 3 and 25° C. for Example 4, and the processing aids and LR-PPE were added. The solution was continuously agitated until they were evenly dispersed in the solution, thereby obtaining flowable impregnation liquid (or varnish) with even microspore dispersion.

Comparative Example 5

The formula used is as shown in Table 4. HM-PPE and the first solvent (or rich solvent) were placed into a three-neck flask subject to consistent agitation (agitation performed throughout the process, with the tangential velocity at the terminal of the agitating vane kept above 3 m/s). The solution was then warmed to 90° C. With certain believe that HM-PPE fully dissolved and when the solution was cooled to 70° C., the second solvent (or lean solvent) was added slowly (10 g/min) into the three-neck flask while the temperature was decreased at a rate of 1° C. per minute. During dropwise addition of the second solvent (or lean solvent) and cooling, PPE was consistency separated a, thereby forming microspores.

After addition of the second solvent (or lean solvent) was completed, the microspore dispersion was cooled to 12° C., and the processing aids and LR-PPE were added. The solution was continuously agitated until they were evenly dispersed in the solution, thereby obtaining flowable impregnation liquid (or varnish) with even microspore dispersion.

Comparative Example 6

The formula used is as shown in Table 4. HM-PPE, LR-PPE and the first solvent (or rich solvent) were placed into a three-neck flask subject to consistent agitation (agitation performed throughout the process, with the tangential velocity at the terminal of the agitating vane kept above 3m/s). The solution was then warmed to 110° C. With certain believe that HM-PPE fully dissolved and when the solution was cooled to 80° C., the second solvent (or lean solvent) was added slowly (10 g/min) into the three-neck flask while the temperature was decreased at a rate of 1° C. per minute. After addition of the second solvent (or lean solvent), the solution was cooled to 20° C. At this time, the weight ratio of the first solvent (or rich solvent) to the second solvent (or lean solvent) is equal to 2.37 (which is greater than 2), so the impregnation liquid was like gel and not usable in an impregnation process.

Comparative Examples 7-8

The formula used is as shown in Table 4. LR-PPE, the processing aids and the first solvent (or rich solvent) were placed into a three-neck flask. The temperature was respectively controlled at 38° C. for Comparative Example 7 and at 5° C. for Comparative Example 8. The solution was agitated for two hours (agitation performed throughout the process, with the tangential velocity at the top of the agitating vane kept above 3 m/s), thereby obtaining impregnation liquid (or varnish).

Comparative Example 9-11

The formula used is as shown in Table 4. HM-PPE, LR-PPE, the first solvent (or rich solvent), and the processing aids were placed into a three-neck flask. The solution was respectively controlled at 22° C. for Comparative Example 9, at 40° C. for Comparative Example 10, and at 3° C. Comparative Example 11. The solution was agitated for 2 hours at the room temperature (agitation performed throughout the process, with the tangential velocity at the top of the agitating vane kept above 3 m/s), thereby obtaining impregnation liquid (or varnish). The solid content in the solution was below 25%. Since the resultant impregnation liquid had its solid content too low, the dried prepreg had its resin content below 30% and was not usble in a heat press process for making copper clad laminates. Where the solid content in the resultant impregnation liquid was increased, the impregnation liquid (or varnish) was gel-like, and also not suitable for an impregnation process.

Comparative Example 12

The formula used is as shown in Table 4. HM-PPE, LR-PPE, ethanol, and the processing aids were placed into a three-neck flask subject to consistent agitation (agitation performed throughout the process, with the tangential velocity at the top of the agitating vane kept above 3 m/s). The solution was warmed to 75° C., and HM-PPE remained undissolved in ethanol, so no impregnation liquid was made.

Preparation of Copper Clad Laminates

1. PPE microspore dispersions of Examples 1-16 were used.
   Glass fabrics (supplied by Nan Ya Plastics Corp., Fabric Model: 2116) was impregnated with the PPE microspore dispersions or varnish of Examples 1-16, and heated in an oven to dry out the solvents.
   Prepregs were obtained when the solvents were completely dried. Six prepregs were sandwiched between two 35-μm copper foils. A force of 10 kg/cm$^2$ was applied to the laminate, and the laminate was heated at a rate of 3.0° C./min When the laminate was heated from the room temperature to 100° C., the force applied thereto was increased to 45 kg/cm$^2$. Heating was continued at a rate of 4.0° C./min until 210° C. The temperature was held for 120 minutes, and then the laminate was slowly cooled (−3° C./min) to 130° C., thereby obtaining a copper clad laminate.
   The formulas of the PPE microspore dispersions of Examples 1-16 and the measured physical measurements of copper clad laminates made therefrom are listed in Table 3.
2. Impregnation liquid (or varnish) of Comparative Examples 1-12 were used.
   Glass fabrics (supplied by Nan Ya Plastics Corp., Fabric Model: 2116) was impregnated with the PPE microspore dispersions or varnish, and heated in an oven to dry out the solvents.
   Prepregs were obtained when the solvents were completely dried. Six prepregs were sandwiched between two 35-μm copper foils. A force of 10 kg/cm$^2$ was applied to the laminate, and the laminate was heated at a rate of 3.0° C./min When the laminate was heated from the room temperature to 100° C., the force applied thereto was increased to 45 kg/cm$^2$. Heating was continued at a rate of 4.0° C./min until 210° C. The temperature was held for 120 minutes, and then the laminate was slowly cooled (−3° C./min) to 130° C., thereby obtaining a copper clad laminate.
   The formulas of the impregnation liquids (or varnishes) used in Comparative Examples 1-12 and measured physical properties made therefrom are listed in Table 4.

TABLE 3

| Composition (by weight) | | | Example | | | | | | | |
| --- | --- | --- | --- | --- | --- | --- | --- | --- | --- | --- |
| | | | 1 | 2 | 3 | 4 | 5 | 6 | 7 | 8 |
| PPE microspore dispersion formula | PPE resin | PPE-A1 | 30 | 30 | — | — | — | — | — | — |
| | | PPE-A2 | — | — | 30 | 30 | 30 | 40 | — | — |
| | | PPE-A3 | — | — | — | — | — | — | 30 | 30 |
| | | PPE-A4 | — | — | — | — | — | — | — | — |
| | | PPE-A5 | — | — | — | — | — | — | — | — |
| | | PPE-A6 | — | — | — | — | — | — | — | — |
| | | PPE-B1 | 10 | 10 | 10 | — | — | — | 10 | — |

TABLE 3-continued

| Composition (by weight) | | | 1 | 2 | 3 | 4 | 5 | 6 | 7 | 8 |
|---|---|---|---|---|---|---|---|---|---|---|
| | | PPE-B2 | — | — | — | 10 | — | 0 | — | 10 |
| | | PPE-B3 | — | — | — | — | 10 | — | — | — |
| | Polybutadiene resin | | 5 | 5 | 5 | 5 | 5 | 5 | 5 | 5 |
| | Crosslinking agent | TAIC | 10 | 10 | 10 | 10 | 10 | 10 | 10 | 10 |
| | Flame | BT-93 | — | 20 | 20 | 20 | — | 20 | 20 | 20 |
| | | MPP | 20 | — | — | — | 20 | — | — | — |
| | Filler | SiO$_2$ | 25 | 25 | 25 | 25 | 25 | 25 | 25 | 25 |
| | Initiator | DCP | 1.2 | 1.2 | 1.2 | 1.2 | 1.2 | 1.2 | 1.2 | 1.2 |
| | 1st solvent | Toluene | — | 45 | — | 45 | — | — | — | — |
| | | Xylene | 45 | — | 45 | — | 45 | 45 | 60 | 45 |
| | 2nd solvent | ethanol | — | — | — | — | — | 90 | — | — |
| | | MEK | — | 90 | 90 | — | — | — | 75 | 90 |
| | | DMF | 90 | — | — | 90 | 90 | — | — | — |
| Solid content | wt % | | 45.3 | 45.3 | 45.3 | 45.3 | 45.3 | 45.3 | 45.3 | 45.3 |
| viscosity | Cps | | 52 | 44 | 42 | 57 | 60 | 61 | 48 | 37 |
| Diameter of microspore | D$_{10}$ (μm) | | 1.61 | 1.40 | 1.35 | 1.50 | 1.49 | 1.50 | 1.49 | 1.49 |
| | D$_{50}$ (μm) | | 3.89 | 3.16 | 3.02 | 3.12 | 3.23 | 3.57 | 3.17 | 3.15 |
| | D$_{90}$ (μm) | | 9.01 | 7.89 | 7.38 | 7.63 | 7.44 | 9.49 | 7.36 | 6.62 |
| SEM | Figure No. | | 1 | — | — | — | 3 | — | — | — |
| EDS | Figure No. | | 2 | — | — | — | 4 | — | — | — |
| Impregnation liquid | | | | | | PPE microspore dispersion | | | | |
| Impregnated temperature (° C.) | | | 25 | 32 | 18 | 12 | 3 | 40 | 25 | 27 |
| Glass transition temperature (° C.) (DMA) | | | 210 | 214 | 215 | 218 | 217 | 221 | 218 | 216 |
| Water absorbency (%) | | | 0.22 | 0.29 | 0.27 | 0.26 | 0.25 | 0.29 | 0.24 | 0.27 |
| Resistance to 288° C. solder heat (second) | | | Over 10 | Over 10 | Over 10 | Over 10 | Over 10 | Over 10 | Over 10 | Over 10 |
| Copper foil's peel strength (lb/in) | | | 6.2 | 6.5 | 6.8 | 6.4 | 6.4 | 6.5 | 7.0 | 7.6 |
| Substrate | D$_k$ (3 GHz) | | 3.72 | 3.64 | 3.64 | 3.56 | 3.61 | 3.82 | 3.58 | 3.58 |
| | D$_f$ (3 GHz) | | 0.0040 | 0.0040 | 0.0040 | 0.0040 | 0.0041 | 0.0041 | 0.0039 | 0.0040 |
| Flame retardancy (UL-94) | | | V0 | V0 | V0 | V0 | V0 | V0 | V0 | V0 |

| | | | Example | | | | | | | |
|---|---|---|---|---|---|---|---|---|---|---|
| Composition (by weight) | | | 9 | 10 | 11 | 12 | 13 | 14 | 15 | 16 |
| PPE microspore dispersion formula | PPE resin | PPE-A1 | — | — | — | — | — | — | — | — |
| | | PPE-A2 | — | — | — | — | — | — | — | — |
| | | PPE-A3 | 40 | — | — | — | — | — | — | — |
| | | PPE-A4 | — | 30 | 40 | — | — | — | — | — |
| | | PPE-A5 | — | — | — | 30 | 30 | 40 | — | — |
| | | PPE-A6 | — | — | — | — | — | — | 30 | 30 |
| | | PPE-B1 | — | 10 | — | 10 | 10 | — | — | — |
| | | PPE-B2 | 0 | — | 0 | — | — | 0 | 10 | — |
| | | PPE-B3 | — | — | — | — | — | — | — | 10 |
| | Polybutadiene resin | | 5 | 5 | 5 | 5 | 5 | 5 | 5 | 5 |
| | Crosslinking agent | TAIC | 10 | 10 | 10 | 10 | 10 | 10 | 10 | 10 |
| | Flame | BT-93 | — | 20 | — | 20 | — | 20 | 20 | — |
| | | MPP | 20 | — | 20 | — | 20 | — | — | 20 |
| | Filler | SiO$_2$ | 25 | 25 | 25 | 25 | 25 | 25 | 25 | 25 |
| | Initiator | DCP | 1.2 | 1.2 | 1.2 | 1.2 | 1.2 | 1.2 | 1.2 | 1.2 |
| | 1st solvent | Toluene | 45 | 60 | — | 60 | 60 | 60 | 60 | 60 |
| | | Xylene | — | — | 60 | — | — | — | — | — |
| | 2nd solvent | ethanol | 90 | 75 | 75 | — | — | 75 | — | — |
| | | MEK | — | — | — | 75 | 90 | — | — | — |
| | | DMF | — | — | — | — | — | — | 75 | 90 |
| Solid content | wt % | | 45.3 | 45.3 | 45.3 | 45.3 | 42.7 | 45.3 | 45.3 | 42.7 |
| viscosity | Cps | | 58 | 52 | 61 | 44 | 34 | 58 | 42 | 37 |
| Diameter of microspore | D$_{10}$ (μm) | | 1.57 | 1.60 | 1.65 | 1.66 | 1.51 | 1.45 | 1.57 | 1.48 |
| | D$_{50}$ (μm) | | 3.91 | 3.96 | 3.75 | 3.16 | 3.11 | 3.82 | 3.20 | 3.17 |
| | D$_{90}$ (μm) | | 7.36 | 9.44 | 7.84 | 7.82 | 7.13 | 8.46 | 8.94 | 7.85 |
| SEM | Figure No. | | 5 | 7 | — | 9 | — | 11 | — | — |
| EDS | Figure No. | | 6 | 8 | — | 10 | — | 12 | — | — |
| Impregnation liquid | | | | | | PPE microspore dispersion | | | | |
| Impregnated temperature (° C.) | | | 39 | 8 | 26 | 16 | 38 | 22 | 25 | 9 |
| Glass transition temperature (° C.) (DMA) | | | 214 | 220 | 219 | 221 | 217 | 227 | 225 | 214 |
| Water absorbency (%) | | | 0.21 | 0.21 | 0.23 | 0.26 | 0.27 | 0.27 | 0.28 | 0.23 |
| Resistance to 288° C. solder heat (second) | | | Over 10 | Over 10 | Over 10 | Over 10 | Over 10 | Over 10 | Over 10 | Over 10 |
| Copper foil's peel strength (lb/in) | | | 7.3 | 725 | 6.8 | 6.5 | 6.4 | 6.3 | 6.2 | 6.2 |
| Substrate | D$_k$ (3 GHz) | | 3.50 | 3.54 | 3.47 | 3.50 | 3.54 | 3.48 | 3.50 | 3.63 |
| | D$_f$ (3 GHz) | | 0.0041 | 0.0041 | 0.0040 | 0.0040 | 0.0041 | 0.0040 | 0.0039 | 0.0040 |
| Flame retardancy (UL-94) | | | V0 | V0 | V0 | V0 | V0 | V0 | V0 | V0 |

TABLE 4

| Composition (by weight) | | | Comparative Example | | | | | | | | | | | |
|---|---|---|---|---|---|---|---|---|---|---|---|---|---|---|
| | | | 1 | 2 | 3 | 4 | 5 | 6 | 7 | 8 | 9 | 10 | 11 | 12 |
| PPE microspore dispersion formula | PPE resin | PPE-A1 | 30 | — | — | — | — | — | — | — | 30 | — | — | — |
| | | PPE-A2 | — | 30 | — | — | — | — | — | — | — | 30 | — | — |
| | | PPE-A3 | — | — | 30 | — | — | — | — | — | — | — | 30 | — |
| | | PPE-A4 | — | — | — | 30 | — | — | — | — | — | — | — | 30 |
| | | PPE-A5 | — | — | — | — | 30 | — | — | — | — | — | — | — |
| | | PPE-A6 | — | — | — | — | — | 30 | — | — | — | — | — | — |
| | | PPE-B1 | 10 | 10 | 10 | — | 10 | — | — | 20 | — | — | 10 | — |
| | | PPE-B2 | — | — | — | — | — | 10 | — | — | 10 | 10 | — | — |
| | | PPE-B3 | — | — | — | 10 | — | — | 40 | 20 | — | — | — | 10 |
| | Polybutadiene resin | | 5 | 5 | 5 | 5 | 5 | 5 | 5 | 5 | 5 | 5 | 5 | 5 |
| | Crosslinking agent | TAIC | 10 | 10 | 10 | 10 | 10 | 10 | 10 | 10 | 10 | 10 | 10 | 10 |
| | Flame | BT-93 | 20 | 20 | — | — | 20 | 20 | 20 | 20 | 20 | 20 | 20 | 20 |
| | | MPP | — | — | 20 | 20 | — | — | — | — | — | — | — | — |
| | Filler | SiO$_2$ (D$_{50}$ = 2 μm) | 25 | 25 | 25 | 25 | 25 | 25 | 25 | 25 | 25 | 25 | 25 | 25 |
| | Initiator | DCP | 1.2 | 1.2 | 1.2 | 1.2 | 1.2 | 1.2 | 1.2 | 1.2 | 1.2 | 1.2 | 1.2 | 1.2 |
| | 1st solvent | Toluene | 45 | — | 45 | — | 45 | 95 | — | 100 | 400 | — | 500 | — |
| | | Xylene | — | 45 | — | 45 | — | — | 100 | — | — | 400 | — | — |
| | 2nd solvent | ethanol | — | 90 | — | — | 90 | — | — | — | — | — | — | 600 |
| | | MEK | 90 | — | — | 90 | — | 40 | — | — | — | — | — | — |
| | | DMF | — | — | 90 | — | — | — | — | — | — | — | — | — |
| Solid content | | wt % | 45.3 | 45.3 | 45.3 | 45.3 | 45.3 | 45.3 | 52.8 | 52.8 | 21.8 | 21.8 | 18.3 | 15.7 |
| viscosity | | Cps | 51 | 56 | 60 | 53 | 62 | — | 132 | 134 | 347 | 393 | 424 | — |
| Diameter of microspore | | D$_{10}$(um) | 1.40 | 1.49 | 1.35 | 1.57 | 1.66 | — | — | — | — | — | — | — |
| | | D$_{50}$(um) | 4.78 | 5.13 | 4.92 | 5.24 | 4.32 | — | | | | | | |
| | | D$_{90}$(um) | 9.81 | 9.44 | 9.49 | 10.12 | 9.87 | — | | | | | | |
| Impregnation liquid | | | dispersion liquid obtained from PPE particle mixed with addition | | | | | | | | | | | |
| Impregnated temperature (° C.) | | | 15 | 40 | 32 | 25 | 12 | 20 | | | | | | |
| Glass transition temperature (° C.) (DMA) | | | 196 | 197 | 195 | 194 | 187 | — | | | | | | |
| Water absorbency (%) | | | 0.40 | 0.47 | 0.45 | 0.44 | 0.41 | | | | | | | |
| Resistance to 288° C. solder heat (second) | | | Over 10 | Over 10 | Over 10 | Over 10 | Over 10 | | | | | | | |
| Copper foil's peel strength (lb/in) | | | 5.0 | 5.1 | 5.5 | 5.3 | 5.1 | — | | | | | | |
| Substrate | | D$_k$ (3 GHz) | 4.11 | 4.19 | 4.15 | 4.13 | 4.28 | — | | | | | | |
| | | D$_f$ (3 GHz) | 0.0054 | 0.0055 | 0.0052 | 0.0050 | 0.0053 | — | | | | | | |
| Flame retardancy (UL-94) | | | V0 | V0 | V0 | V0 | V0 | V0 | | | | | | |

| | | | | | | |
|---|---|---|---|---|---|---|
| microspore | $D_{50}$(um) | — | — | — | — | — | — |
| | $D_{90}$(um) | — | — | — | — | — | — |
| Impregnation liquid | | PPE was dissolved in varnish | | undissolved | | | |
| Impregnated temperature (° C.) | | 38 | 5 | 22 | 40 | 3 | — |
| Glass transition temperature (° C.) (DMA) | | 187 | 186 | — | — | — | — |
| Water absorbency (%) | | 0.47 | 0.45 | — | — | — | — |
| Resistance to 288° C. solder heat (second) | | Over 10 | Over 10 | — | — | — | — |
| Copper foil's peel strength (lb/in) | | 5.6 | 5.5 | — | — | — | — |
| Substrate | $D_k$ (3 GHz) | 4.12 | 4.15 | — | — | — | — |
| | $D_f$ (3 GHz) | 0.0049 | 0.0051 | — | — | — | — |
| Flame retardancy (UL-94) | | V0 | V0 | — | — | — | — |

Results:
1. The PPE microspore dispersions of Examples 1-16 contain PPE microspores which are evenly dispersed and constituted by HM-PPE to wrap around the processing aids tightly. Since PPE and the processing aids were well combined, excellent dielectric properties were achieved.
2. The PPE microspore dispersions of Examples 1-16 displayed good flowability at the room temperature, thereby allowing glass fabrics to be impregnated below 40° C. This eliminates the need of using high-temperature impregnation equipment, and providing benefits related to safety and economics.
3. When the PPE microspore dispersions of Examples 1-16 were used to make copper clad laminates, sicne HM-PPE and the processing aids were well combined, the resultant copper clad laminates enjoy excellent physical properties such as high Tg, low $D_k$, low $D_f$, and high copper foil's peel strength.
4. In each of Comparative Examples 1-5, the impregnation liquid (or varnish) was made by forming PPE particles first and then adding the processing aids. However, in such impregnation liquid (or varnish), PPE and the processing aids were simply mixed without generating any PPE microspores, so PPE and the processing aids were not well combined. Copper clad laminates made using such impregnation liquid (or varnish) displayed poor physical properties, including low Tg, high $D_k$, high $D_f$ and low copper foil's peel strength.
5. In Comparative Example 6, the weight ration between the rich and lean solvents was 2.37 (greater than 2), so the resultant impregnation liquid was gel-like and not usable in impregnation processes.
6. Comparative Examples 7-8 did not use HM-PPE (Mn greater than 12,000 g/mol). Instead, LR-PPE (Mn less than 6,000 g/mol) was dissolved below 40° C., and processing aids were added to make impregnation liquid (or varnish). However, copper clad laminates made using such impregnation liquid (or varnish) exhibited poor physical properties, including low Tg, high Dk, high Df and low copper foil's peel strength.
7. In Comparative Examples 9-11, impregnation liquid (or varnish) was made using the rich solvent to dissolve PPE at the room temperature and then adding the processing aids Impregnation liquid (or varnish) such prepared contained a solid content below 25%. Coinsequently, the dried preperg contained only less than 30% resin, and was not usble in heat press for making copper clad laminates. Where the solid content in the resultant impregnation liquid was increased, the impregnation liquid (or varnish) was gel-like, and also not suitable for an impregnation process.
8. As proven by the impregnation liquid (or varnish) of Comparative Example 12, HM-PPE was not dissolved in ethanol (as the lean solvent), and no impregnation liquid (or varnish) was made in this way.

What is claimed is:
1. A process for preparing a polyphenylene ether microspore dispersion comprising the following steps:
(a) selecting a high-molecular polyphenylene ether (HM-PPE) that has a number-average molecular weight (Mn) ranging between 12,000 g/mole and 30,000 g/mole, and a low-molecular polyphenylene ether (LR-PPE) that has a number-average molecular weight (Mn) ranging between 800 g/mole and 6,000 g/mole, respectively;
(b) selecting a first solvent that dissolves the HM-PPE at 45-110° C., and selecting a second solvent that does not dissolve the HM-PPE;
wherein the first solvent is one or more selected from the group consisting of benzene, methylbenzene, dimethylbenzene, trimethylbenzene and any combinations thereof; and
wherein the second solvent is one or more selected from the group consisting of dimethyl ketone, methyl ethyl ketone, methyl isobutyl ketone, ethanol, propanol, butanol, pentanol, hexanol, dimethylformamide, methylacetamide, diethylamide and any combinations thereof;
(c) dissolving the HM-PPE of Step (a) in the first solvent at a temperature ranging between 45° C. and 110° C. to form a PPE-based dissolution liquid;
(d) adding the LR-PPE of Step (a) and processing aids being chosen as additives together into the PPE-based dissolution liquid of Step (c), and then performing adequate agitation until the LR-PPE and the processing aids are evenly dispersed throughout the dissolution liquid;
wherein, the processing aids are one or more selected from the group consisting of a polybutadiene resin, a flame retardant, a filler, a crosslinking agent, an initiator and any combinations thereof;
(e) cooling the PPE-based dissolution liquid of Step (d) to a temperature ranging between 42° C. and 80° C., and adding the second solvent of Step (b) into the cooled PPE-based dissolution liquid of Step (d) under a weight ratio of the first solvent to the second solvent ranging between 0.10 and 2.0, to cause the PPE to wrap around the processing aids to form as PPE microspores occurred constantly in the PPE-based dissolution liquid; and
(f) cooling the PPE-based dissolution liquid of Step (e) to a temperature ranging between 0° C. and 40° C., so as to obtain the PPE microspore dispersion that is suitable for impregnation processes performed below 40° C.

2. The process for preparing a polyphenylene ether microspore dispersion of claim 1, wherein the weight ratio of the first solvent to the second solvent ranges between 0.15 and 1.5.

3. The process for preparing a polyphenylene ether microspore dispersion of claim 1, wherein the weight ratio of the first solvent to the second solvent ranges between 0.20 and 1.2.

4. The process for preparing a polyphenylene ether microspore dispersion of claim 1, wherein the flame retardant is selected from a bromine-containing flame retardant, a phosphorus-containing flame retardant, an ammonium polyphosphate-based flame retardant, a melamine polyphosphate-based flame retardant, a melamine cyanurate-based flame retardant, a phosphonitrile-based flame retardant or an inorganic flame retardant.

5. The process for preparing a polyphenylene ether microspore dispersion of claim 1, wherein the filler is one or more selected from the group consisting of SiO2, Al(OH)3, Al2O3, TiO2, Mg(OH)2 and CaCO3.

6. The process for preparing a polyphenylene ether microspore dispersion of claim 1, wherein the crosslinking agent is one or more selected from the group consisting of triallyl isocyanurate (TAIC), triallyl cyanurate (TAC), trimethallyl isocyanurate (TMAIC), trimethylolpropane trimethacrylate (TMPTMA), divinyl benzene, divinyl naphthalene, diallyl phthalate and diallyl isocyanurate.

7. The process for preparing a polyphenylene ether microspore dispersion of claim 1, wherein the initiator is selected from benzoyl peroxide (BPO), cumyl hydroperoxide (CHP), dicumyl peroxide (DCP), tert-butyl cumyl peroxide, imidazole (IMZ), triphenylphosphine (TPP), 2-methylimidazole (2MI), 2,5-dimethyl-2,5-di(tert-butylperoxy) hexane (DHBP), 2,5-di(tert-butylperoxy)-2,5-dimethyl-3-hexyne, or 1,1-di-(tert-butylperoxy)-3,3,5-trimethylcyclohexane (TMCH).

8. The process for preparing a polyphenylene ether microspore dispersion of claim 1, wherein the PPE microspore dispersion has a viscosity ranging between 10 Cps and 400 Cps.

9. The process for preparing a polyphenylene ether microspore dispersion of claim 8, wherein the PPE microspore dispersion contains a solid content composed of the PPE microspores and non-PPE microspores, and the solid content takes up 30-70% by weight of the overall dispersion.

10. The process for preparing a polyphenylene ether microspore dispersion of claim 9, wherein the PPE microspore contains the HM-PPE taken up more than 80%, by weight of the PPE microspore.

11. The process for preparing a polyphenylene ether microspore dispersion of claim 9, wherein said PPE microspore dispersion contains those PPE microspores having a diameter of 0.5~20 μm are taken up more than 70% by weight of the total PPE microspores dispersed in said PPE microspore dispersion.

* * * * *